(12) United States Patent
Schuster (10) Patent No.: US 10,606,078 B2
(45) Date of Patent: Mar. 31, 2020

(54) OPTICAL ELEMENT

(71) Applicant: Carl Zeiss Smart Optics GmbH, Aalen (DE)

(72) Inventor: Karl-Heinz Schuster, Koenigsbronn (DE)

(73) Assignee: TOOZ TECHNOLOGIES GMBH, Aalen (DE)

( * ) Notice: Subject to any disclaimer, the term of this patent is extended or adjusted under 35 U.S.C. 154(b) by 0 days.

(21) Appl. No.: 15/550,605

(22) PCT Filed: Feb. 3, 2016

(86) PCT No.: PCT/EP2016/052261
§ 371 (c)(1),
(2) Date: Aug. 11, 2017

(87) PCT Pub. No.: WO2016/128270
PCT Pub. Date: Aug. 18, 2016

(65) Prior Publication Data
US 2018/0031839 A1   Feb. 1, 2018

(30) Foreign Application Priority Data

Feb. 12, 2015 (DE) ........................ 10 2015 102 012

(51) Int. Cl.
*G02B 27/01* (2006.01)
*G02B 1/04* (2006.01)
(Continued)

(52) U.S. Cl.
CPC ......... *G02B 27/0172* (2013.01); *G02B 1/041* (2013.01); *G02B 6/0035* (2013.01);
(Continued)

(58) Field of Classification Search
CPC .... G02B 2027/0112; G02B 2027/0114; G02B 2027/0116; G02B 2027/0118;
(Continued)

(56) References Cited

U.S. PATENT DOCUMENTS 5,811,506 A   9/1998   Slagel
5,962,617 A   10/1999  Slagel
(Continued)

FOREIGN PATENT DOCUMENTS

DE   203 17 099 U1   1/2004
EP   0 872 506 A1    10/1998
(Continued)

OTHER PUBLICATIONS

International Search Report for International Application No. PCT/EP2016/052261, dated Mar. 22, 2016; 3 pages.
(Continued)

*Primary Examiner* — Travis S Fissel
(74) *Attorney, Agent, or Firm* — Patterson Thuente Pedersen, P.A.

(57) ABSTRACT

An optical element for a display device that can be placed on the head of a user and generate an image as a virtual image. The optical element having a first part, which comprises an optically effective structure, and a second part connected to one another by an adhesive composition comprising a ultra material. The first part material comprises one or more cycloolefin polymers, the first and third material are different from one another, and the second part material and third material in each case comprise at least one organic polymer. The refractive index differences for at least one wavelength between 380 nm and 800 am between the first and the second material and between the second and the third material are in each case ≤0.02. The method of producing
(Continued)

the optical element and the display device comprising the optical element are also provided.

19 Claims, 3 Drawing Sheets

(51) Int. Cl.
  *F21V 8/00* (2006.01)
  *G02C 7/02* (2006.01)
(52) U.S. Cl.
  CPC ........ *G02C 7/02* (2013.01); *G02B 2027/0125* (2013.01); *G02B 2027/0178* (2013.01); *G02B 2027/0194* (2013.01); *G02C 2202/16* (2013.01)
(58) Field of Classification Search
  CPC ...... G02B 2027/012; G02B 2027/0121; G02B 2027/0123; G02B 2027/0125; G02B 27/01; G02B 27/0101; G02B 27/0103; G02B 27/0149; G02B 27/017; G02B 27/0172; G02B 27/0176; G02B 27/0179; G02B 27/0189
  USPC .................................. 359/618, 619, 630–638
  See application file for complete search history.

(56) References Cited

U.S. PATENT DOCUMENTS

| | | | |
|---|---|---|---|
| 6,127,505 A | 10/2000 | Slagel | |
| 6,258,917 B1 | 7/2001 | Slagel | |
| 7,764,855 B2 * | 7/2010 | Roba | C03C 25/106 385/128 |
| 2002/0176172 A1 * | 11/2002 | Nemoto | B29C 65/562 359/619 |
| 2003/0224191 A1 * | 12/2003 | Peiffer | B29C 55/023 428/480 |
| 2010/0225032 A1 * | 9/2010 | Nakane | B29C 49/0005 264/537 |
| 2012/0002294 A1 * | 1/2012 | Dobschal | G02B 27/0172 359/630 |
| 2012/0021151 A1 * | 1/2012 | Tatarka | B32B 1/08 428/35.1 |
| 2014/0043850 A1 * | 2/2014 | Thompson | G02B 6/0035 362/607 |
| 2014/0049983 A1 * | 2/2014 | Nichol | G02B 6/0018 362/610 |
| 2014/0092482 A1 * | 4/2014 | Dubroca | G02B 27/0101 359/633 |
| 2014/0334009 A1 | 11/2014 | Ushiyama | |
| 2014/0340759 A1 | 11/2014 | Yano | |

FOREIGN PATENT DOCUMENTS

| | | |
|---|---|---|
| EP | 1 942 364 A1 | 7/2008 |
| WO | WO 2009/134365 A1 | 11/2009 |

OTHER PUBLICATIONS

English translation of International Search Report for International Application No. PCT/EP2016/052261, dated Mar. 22, 2016; 3 pages.
English translation of International Preliminary Report on Patentability for PCT/EP2016/052261, dated Aug. 24, 2017, 9 pages.

* cited by examiner

OPTICAL ELEMENT

RELATED APPLICATIONS

The present application is a National Phase entry of PCT Application No. PCT/EP2015/051834, filed Jan. 28, 2016, which claims priority from DE Patent Application No. 10 2015 101 251.0, filed Jan. 28, 2015, both of said applications being hereby incorporated by reference herein in their entirety.

TECHNICAL FIELD

The present invention relates to an optical element in which an optically effective structure is embedded, for a display device which can be placed onto the head of a user and generates an image a display device which comprises the optical element, a method for producing the optical element, and in some aspects the optical element used as a spectacle lens, wherein an imaging optical unit projects a generated image in such a way that the user can perceive it as a virtual image.

BACKGROUND

Originally only optical glass was used as lens material for lens systems and spectacles. With the advances that have been made in the production of optically transparent plastics, such plastics have increasingly been used in lens systems and today predominantly also in spectacles. Plastics as a lens material have requirements similar to optical glasses, that is to say a good optical homogeneity, high spectral transmission, reproducible refractive index values and dispersion, low stress birefringence, low internal scattering, low water absorption, high chemical resistance in the case of terminating elements and high geometrical accuracy in machining and high dimensional accuracy in molding or injection molding. The main requirements for spectacle materials are a low weight, thin geometry as a result of a high refractive index of the material, UV protection, high mechanical load-bearing capacity as protective goggles or sports goggles or spectacles and abrasion resistance as a result of hardness of the substrate or hard protective layers.

A high mechanical load-bearing capacity can be achieved for example by plastics of polycarbonate or polyurethane. Examples of branded products are Trivex® and NXT® polyurethane. The underlying mechanisms of the notch impact strength of the materials Trivex® and NXT® are based inter alia on particles of hard material located therein, whereby a crack that forms has to cover much longer paths through the material, and thereby use up more energy, than in the case of a material without such particles. On the other hand, such particles or microcrystallites in polycarbonates and polyurethanes prevent the formation of functional structures such as gratings or Fresnel structures, since geometrical defects occur at tips, whereby the optical quality suffers. Moreover, depending on size, the microcrystallites are scattered in the visible range, whereby increased stray light occurs, with a disturbing effect in cases of relatively great optical paths.

DISCLOSURE OF THE INVENTION

If further functions are combined in a pair of spectacles, for example due to the requirements of modern social media, such as the input of image information into the eye of an observer, an optical setup that comprises the requirements of a pair of spectacles and a lens system is obtained.

The object of the present invention is therefore to overcome the disadvantages of the prior art and to provide an optical element that has an optically effective structure and, along with a high mechanical load-bearing capacity, at the same time a high internal and external optical quality.

This object is achieved according to the present invention by an optical element for a display device which can be placed onto the head of the user and generates an image, which element has a front side and a rear side, an input portion and an output portion spaced apart from the input portion and a light-guiding channel, which is suitable for guiding bundles of light of pixels of the generated image that are input into the optical element via the input portion of the optical element in the optical element to the output portion, from which they are output from the optical element, wherein the output portion has an optically effective structure which brings about a deflection of the bundles of light for output, and wherein the optical element has a first part of a first material, which comprises the optically effective structure, and the optical element has a second part of a third material, wherein the two parts are connected to one another with an adhesive composition of a second material, wherein the first material comprises one or more cycloolefin polymers, the first and third materials are different from one another, the second and third materials comprise in each case at least one organic polymer and the differences in the refractive index for at least one wavelength of between 380 nm and 800 nm between the first material and the second material and between the second material and the third material are in each case ≤0.02.

Surprisingly, an outstanding internal and external optical quality and at the same time a high mechanical load-bearing capacity can be achieved with this optical element, and the optical element is therefore outstandingly suitable for spectacle lenses with an integrated optical unit, for instance for introducing data.

The object is also achieved by a display device having a holding device that can be placed onto the head of a user, an image generating module that is fastened to the holding device and generates an image, and an imaging optical unit that is fastened to the holding device, has the optical element according to the present invention and, in the state of the holding device in which it has been placed on the head of the user, projects the generated image in such a way that the user can perceive it as a virtual image.

The object is also achieved by a method for producing an optical element in which an optically effective structure is embedded, comprising the following steps:
a) providing a part which has a structured portion on its upper side,
b) applying a coating which is optically effective for the predetermined wavelength range to the structured portion in order to form the optically effective structure,
c) providing a part which has an underside that has a form complementary to the form of the upper side,
d) applying an adhesive composition to the upper side of the first part and/or the underside of the second part and
e) connecting the upper side of the first part to the underside of the second part by means of the adhesive composition, so that an optical element in which the optically effective structure is buried is produced.

The advantage of using a first material of one or more cycloolefin polymers is in particular that with this material complex optical structures, in particular their fine contours, can be reproduced very accurately. Furthermore, cycloolefin polymers also have a high flowability, making injection molding possible and particularly cost-effectively. The stability of the optical element according to the present invention, which is important in particular for smartglasses, is in turn achieved by the second part, which is adhesively bonded to the first part and consists of a different material.

To avoid aberrations, the refractive indices of the three materials mentioned are adjusted to one another in such a way that the differences in the refractive index are as small as possible. Preferably, the differences in the refractive index for at least one wavelength of between 380 nm and 800 nm between the first material and the second material are ≤0.01 and between the second material and the third material are ≤0.01, in particular in each case ≤0.005 and particularly preferably in each case ≤0.001. The difference in the refractive index for at least one wavelength of between 380 nm and 800 nm between the first material and the third material is preferably ≤0.02, in particular ≤0.01, particularly preferably ≤0.005 and more preferably ≤0.001. In a particularly preferred embodiment, the differences in the refractive index between all three materials, i.e. between the first material and the second material, the first material and the third material and the second material and the third material, are in each case ≤0.02, in particular ≤0.01, particularly preferably ≤0.005 and more preferably ≤0.001. In addition, it is preferred that the specified differences in the refractive index are at the same wavelength of between 380 nm and 800 nm, in particular at 589.3 nm. With these small differences in the refractive index, the boundary surface between the materials as it were disappears optically for the predetermined wavelength range and as a result the optical quality is particularly high.

In a further preferred embodiment, the first material comprises a mixture of at least two cycloolefin polymers that are different from one another. Such different cycloolefin polymers generally have different refractive indices and a particularly exact adaptation of the refractive index to the second material and/or the third material is possible by the mixing of two or more different cycloolefin polymers.

The first material comprises one or more cycloolefin polymers. In a preferred embodiment, the proportion of the one or more cycloolefin polymers, based on the total weight of the first material, is at least 95% by weight, in particular at least 98% by weight. The cycloolefin polymer may contain customary additives, for example plasticizers, stabilizers and antioxidants.

The cycloolefin polymers known to a person skilled in the art, for example those described in EP 0 872 506 B1, the disclosure of which is incorporated herein by reference, may be used as the cycloolefin polymer (COP). These may be polymers of monocyclic or polycyclic olefins, in each case with one or more double bonds, for example cyclopentene, cyclohexene, cycloheptene, norbornene and derivatives thereof, in particular alkyl derivatives, cyclopentadiene, in particular the C5 fraction of dicyclopentadiene. The polymers may optionally take the form of copolymers with straight-chain or branched olefins, such as for example ethylene, propylene, 1-butene, isobutylene, 1-pentene, 1-hexene, 1-octene or 3-methyl-1-butene. Particularly preferred cycloolefin polymers are the branded products Zeonex® and Zeonor® by Zeon Corporation, in particular Zeonex®.

For the third material, it is likewise preferred that it comprises two or more polymers, in order to make a particularly exact adaptation of the refractive index to the other materials possible. As in the case of the first material, the polymer or polymers of the third material preferably makes/make up at least 95% by weight, in particular at least 98% by weight, based on the total weight of the third material.

The third material comprises a polymer and is not a cycloolefin polymer. The third material is preferably a thermoset (duroplast). Preferably, the polymer of the third material is a polyurethane. In a preferred embodiment, the polyurethane contains particles, in particular particles of polyurethane, for example nano domains of nitrogen-enriched polyurethane or nitrides, preferably with a diameter of 30-50 nm. The particles in the polyurethane, which may also be referred to as hard islands, with a diameter of 30-50 nm are not effective for visible light, i.e. very little stray light is produced. The polyurethane is preferably a polyurethane suitable for spectacle lenses. Polyurethanes with a high notched impact strength, as are typically used for spectacle lenses, are preferred. Trivex® and NXT® polyurethanes are most preferred as polyurethanes for the third material. The materials Trivex® and NXT® polyurethane are very light-weight (approximately 1.1 g/cm$^3$), extremely resistant to notched impact, transparent in the visible wavelength range, UV-absorbent and, if they are molded in mold shells, subsequently have relatively little stress.

The first, second and/or third material is preferably transparent in a predetermined wavelength range. The predetermined wavelength range is preferably the wavelength range of 380-800 nm, in particular 380-780 nm.

The optical bond between the first part and the second part is provided by an adhesive composition. This is likewise adjusted in its refractive index to suit the two parts being joined, in that the components of the adhesive composition or the radicals thereof are adjusted to the desired refractive index in the cured state. This prevents the total internal reflection of the beam introduced and also undesired Fresnel reflections. Such adhesives for optical components are also referred to as cement.

All commonly used materials that are optically transparent and the refractive index of which meets the conditions according to the invention for the differences in the refractive index with regard to the first material and the third material are suitable for the adhesive composition, i.e. the second material. In particular, it may be an adhesive composition of which the adhesive or bonding property is produced by activation, for example UV activation. Suitable adhesive compositions are for example adhesive compositions on the basis of epoxy resins that are cured with alcohol or thiols or polyurethane adhesives on the basis of diisocyanates or polyisocyanates and alcohols.

In a preferred embodiment, the optically effective structure may be completely embedded in the optical element, so that it does not extend to any outer boundary surface of the optical element. The optically effective structure is preferably smaller in its dimensions than the size of the optical element. This means that the optically effective structure is only formed in part of the optical element. The embedded optically effective structure may have a maximum lateral dimension that is less than the maximum lateral dimension of the optical element. In particular, it may be less than 50% of the lateral dimension of the optical element or else less than 40%, 30% or 20% of the lateral dimension of the optical element. Preferably, the optically effective structure forms a depression in the first part and the depression is completely filled with the adhesive composition.

The optically effective structure may for example be formed as a reflective and/or diffractive structure. In particular, the optically effective structure may be formed as a partially reflective structure and/or a wavelength-dependent reflective structure. The reflective surface elements may together provide a deflecting effect and optionally also in addition an imaging effect. The optically effective structure preferably has reflective surface elements that are spaced apart from one another.

In particular in the case of a shell-shaped first part and second part, the sequence of the materials for the first part and the second part in the optical element according to the invention may be such that the first material (cycloolefin polymer) is present on the inside (first part) and the third material (in particular a polyurethane) is present on the outside, the optically effective structure being present in the first material, i.e. on the inside. Alternatively, the third material (second part, in particular a polyurethane) may be present on the inside and the first material (cycloolefin polymer) may be present on the outside, the optically effective structure once again being present in the first material (cycloolefin polymer).

In a preferred embodiment, the first part (19) and the second part (22) are in each case shells. The thickness of the first shell and/or of the second shell is preferably ≥500 µm, in particular ≥1 mm. Furthermore, the front side may be formed by the side of the second shell that is facing away from the first shell and the rear side may be formed by the side of the first shell that is facing away from the second shell. The sides of the two parts that are facing one another may be connected to one another, preferably adhesively bonded, with the adhesive composition.

The method for producing the optical element according to the invention comprises the steps of:
a) providing a part which has a structured portion on its upper side,
b) applying a coating which is optically effective for the predetermined wavelength range to the structured portion in order to form the optically effective structure,
c) providing a part which has an underside that has a form complementary to the form of the upper side,
d) applying an adhesive composition to the upper side of the first part and/or the underside of the second part, and
e) connecting the upper side of the first part to the underside of the second part by means of the adhesive composition, so that an optical element in which the optically effective structure is buried is produced.

As described above, the first part and the second part preferably take the form of shells. The shells may preferably be of one piece. Against this background, a preferred method for producing the optical element according to the invention which is transparent for a predetermined wavelength range and in which an optically effective structure is embedded has the following steps:
a) providing a first shell, which is transparent for the predetermined wavelength range, is formed in one piece and has a structured portion on its upper side,
b) applying a coating which is optically effective for the predetermined wavelength range to the structured portion in order to form the optically effective structure,
c) providing a second shell, which is transparent for the predetermined wavelength range, is formed in one piece and has a smooth underside, which has a form complementary to the form of the upper side,
d) applying an adhesive composition that is transparent for the predetermined wavelength range to the upper side of the first shell and/or the underside of the second shell, and
e) connecting the upper side of the first shell to the underside of the second shell by means of the adhesive composition, so that a two-shell optical element in which the optically effective structure is buried is produced.

With the method according to the present invention, the optical element can be produced with the desired accuracy in great numbers with only two shells (in particular with precisely two shells). The optical element may however also have more than two shells and also two or more parts which are adhesively bonded or connected to one another with the adhesive composition.

In particular, the first shell and the second shell may be respectively provided in steps a) and c) as a dimensionally stable shell. A dimensionally stable shell is understood as meaning in particular a shell that retains its form if no forces other than the force of gravity are acting on it.

Furthermore, the first shell and the second shell may be provided in steps a) and c) in such a way that the upper side and the underside are formed in a curved manner. Furthermore, the first shell and the second shell may be provided in such a way that the respective side facing away from the upper side and the underside is formed in a curved manner. The curvature may in this case be a spherical curvature, an aspherical curvature or some other curvature.

The first shell may be provided in step a) in such a way that the upper side is formed as a smooth surface with the exception of the structured portion.

Furthermore, after step b), at least one depression formed by the structured portion may be filled with material up to the upper side. The same material from which the first shell is formed is preferably used for this. Furthermore, the adhesive composition may be used for the filling.

The filling may be carried out in one step or in a number of filling steps. In particular, the filling is carried out in such a way that there is a smooth continuous upper side. The filled structured portion consequently forms a continuous surface with the remaining upper side.

In the method according to the present invention, in step d) the adhesive composition may be applied as an adhesive layer to the entire upper side of the first shell and/or the entire underside of the second shell. In particular, the structured portion may also be provided with the adhesive layer (preferably if it is filled with material up to the upper side).

In the method according to the present invention, after step b) and before step d) a protective layer of thermosetting material may be applied to the optically effective coating by molding. The RIM method (reaction injection molding method) in particular may be used for this. In this case, for example, two components may be mixed directly before the injection into a mold, so that the components can react with one another and form a desired chemically crosslinked polymer. The first shell is in this case preferably positioned in a corresponding mold, so that the desired protective layer can be formed.

The forming of the first shell and/or second shell may in particular be carried out in each case in at least two successive substeps. This leads to reduced shrinkage in the production of the first shell and the second shell.

The predetermined wavelength range may be the visible wavelength range, the near infrared range, the infrared range and/or the UV range.

A primary forming process (such as for example injection molding, injection-compression molding, RIM or casting), a forming process (such as for example thermoforming or hot embossing), a removing and/or separating process (such as for example diamond machining, ion bombardment or etching) may be used in each case for providing the first shell according to step a) and the second shell according to step c). It is of course also possible to combine these processes with one another for providing the first shell or the second shell.

The first shell and the second shell are in each case formed in particular as dimensionally stable semifinished products, which are connected to one another by means of the adhesive layer.

In particular, the first shell may have an average thickness from the range of 2 mm-5 mm (for example 3.5 mm) and the second shell may have an average thickness from the range of 0.15 mm to 2 mm or from the range of 0.15 mm to 0.25 mm (for example 0.17 mm). The ratio of the average thickness of the first shell to the average thickness of the second shell may lie in the range of 5-40, 10-35, 15-25 or 18-22 (for example 20, 20.5 or 21).

The first shell may have a region at the periphery (or a peripheral region) which has a greater thickness than the average thickness of the first shell. The peripheral region is preferably not taken into account in the determination of the average thickness of the first shell. Furthermore, the peripheral region may be formed in one piece with the first shell or may be a separate element that is connected to the first shell. For example, the peripheral region may be adhesively bonded or cemented to the first shell. The peripheral region may be formed in such a way that it provides at least one further optical functionality. This may be in particular a diffractive and/or reflective optical functionality. In particular, the first shell with the peripheral region may be formed in such a way that it is L-shaped.

The application of the optically effective coating according to step b) may be performed for example by vapor deposition, sputtering, CVD (chemical vapor deposition), wet coating, etc. The coating may be a single layer. However, it is also possible to apply a number of layers. In particular, an interference layer system may also be applied. Furthermore, at least one layer for adhesion promotion, one layer for mechanical compensation and one protective layer (diffusion/migration, thermal protection, chemical protection, UV protection, etc.) may be additionally applied. The optically effective coating may be designed for special wavelengths or spectral ranges. Furthermore, it may additionally or alternatively have its function dependent on the angle of incidence, the polarization and/or further optical properties. The optically effective structure may be reflective, in particular highly reflective (for example mirror-like), partially transmissive/partially mirrored and/or may provide a filtering effect. Furthermore, the optically effective coating may be a diffractive optical element.

The optically effective coating may only be applied to the structured portion. It is alternatively possible to apply the optically effective coating over the full surface area and then to remove it in the portions of the surface where it is not required. Chemical etching or ion etching may be used for example for such removal.

At least one metal, at least one metal oxide and at least one metal nitride may be used for the optically effective coating. An organic material and/or a polymer material may also be used. Furthermore, so-called hybrid materials, such as for example organic-inorganic hybrid systems or organically modified silanes/polysiloxanes, may be used.

In the method according to the present invention, steps a)-e) may be carried out in such a way that the optically effective structure is completely embedded in the transparent body. Consequently, the optically effective structure does not extend to any material boundary layer of the transparent body.

Furthermore, steps a)-e) may be carried out in such a way that the optically effective structure has surface elements spaced apart from one another that provide the desired optical function. The surface elements may be for example reflective surface elements. The reflective surface elements may bring about a complete reflection (almost 100%) or else only a partial reflection (partially reflective surface elements). In particular, the reflective surface elements lie in a common plane. They may be offset parallel to one another.

The surface elements may themselves be formed in each case as planar surface elements or else as surface elements formed in a curved manner.

In the method according to the present invention, the optical element may be completed after carrying out step e). However, it is also possible to carry out also at least one material-removing machining step, in order for example to machine or work away the boundary surface of the second shell that is facing away from the first shell. The same applies to the boundary surface of the first shell that is facing away from the second shell.

Of course, at least one surface-finishing method step may also be carried out, such as for example the application of an antireflection coating, a hard layer, etc. In particular, the finishing operations known from the production of spectacle lenses may be carried out.

With the method according to the present invention, the finished optical element can consequently be provided. However, it is also possible that still further method steps are necessary in order to complete the optical element in such a way that it can be used for its intended purpose.

Also provided is a display device having a holding device that can be placed onto the head of a user, an image generating module that is fastened to the holding device and generates an image and an imaging optical unit that is fastened to the holding device, has an optical element according to the invention and, in the state of the holding device in which it has been placed on the head of the user, projects the generated image in such a way that the user can perceive it as a virtual image.

The imaging optical unit may have the optical element as a single optical element. It is also possible however that the imaging optical unit has along with the optical element also at least one further optical element.

The display device may have a control unit which activates the image generating module.

The image generating module may in particular have a two-dimensional image generator, such as for example an LCD module, an LCoS module, an OLED module or a tilting mirror matrix. The image generator may have a plurality of pixels, which may for example be arranged in rows and columns. The image generator may be self-illuminating or not self-illuminating.

The image generating module may in particular be formed in such a way that it generates a monochromatic image or a multicolored image.

The display device according to the invention may have further elements known to a person skilled in the art that are necessary for its operation.

Furthermore, a method for producing the display device described is provided. In this case, the optical element according to the invention is produced according to the method of production according to the invention and the optical element according to the invention thus produced is combined (or assembled) with the other elements of the display device in such a way that the display device according to the invention (including its developments) is produced.

It goes without saying that the aforementioned features and those yet to be explained below can be used not only in the combination specified in each case but also in other combinations or on their own, without departing from the scope of the present invention.

The present invention is explained in more detail below for example on the basis of the accompanying drawings, which also disclose features essential to certain embodiments of the present invention. For better clarity of illustration, the figures at least partly do not show a representation that is to scale and in proportion and do not use shading.

BRIEF DESCRIPTION OF THE DRAWINGS

Subject matter hereof may be more completely understood in consideration of the following detailed description of various embodiments in connection with the accompanying figures wherein like reference numerals and letters indicate corresponding elements through the several views, in which.

DETAILED DESCRIPTION OF THE INVENTION

Now referring generally to the Figures. In the case of the embodiment shown in FIG. 1, the display device 1 according to the present invention comprises a holding device 2 that can be placed onto the head of a user and may be formed for example in the manner of a conventional spectacle frame, and also a first spectacle lens 3 and a second spectacle lens 4, which are fastened to the holding device 2. The holding device 2 with the spectacle lenses 3, 4 may be formed for example as sports goggles or spectacles, sunglasses and/or spectacles for correcting defective vision, it being possible for a virtual image to be introduced into the field of view of the user via the first spectacle lens 3, as described below.

Figure 1:
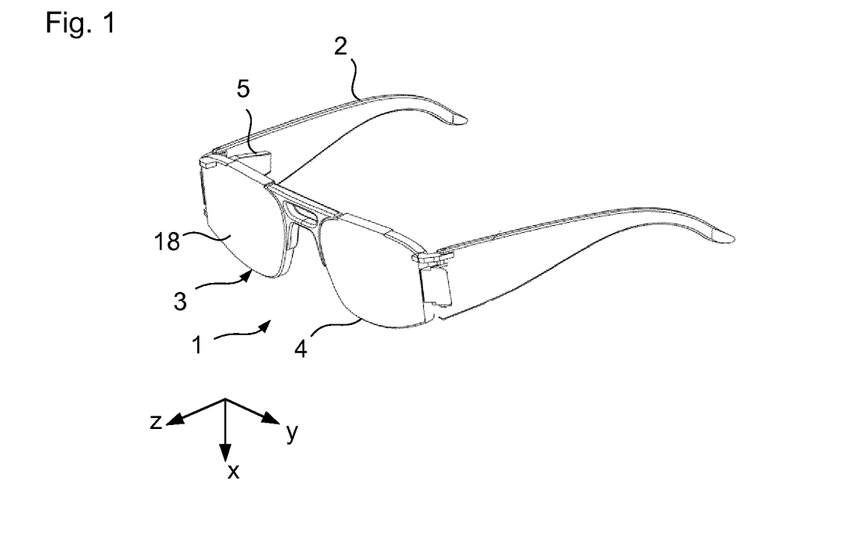
FIG. 1 shows an embodiment of the display device according to the present invention.

For this purpose, the display device 1 comprises an image generating module 5, which may be arranged in the region of the right-hand spectacle earpiece of the holding device 2, as schematically represented in FIG. 1. The image generating module 5 may also be arranged in the region of the left-hand spectacle earpiece of the holding device 2. The image generating module 5 may have a two-dimensional image generating element 6 (FIG. 2), such as for example an OLED chip, an LCD chip or an LCoS chip or a tilting mirror matrix, with a multiplicity of pixels, for example arranged in columns and rows.

The spectacle lenses 3 and 4, and in particular the first spectacle lens 3, are only described by way of example together with the display device 1 according to the invention. The spectacle lenses 3, 4, or at least the first spectacle lens 3, is/are itself/themselves formed in each case as a spectacle lens 3, 4 according to the invention or as an optical element according to the invention. The optical element according to the invention may also be used in a different context than with the display device 1 described here. Therefore, if it is formed as a spectacle lens, the optical element may of course also be formed as a second spectacle lens 4.

Figure 2:
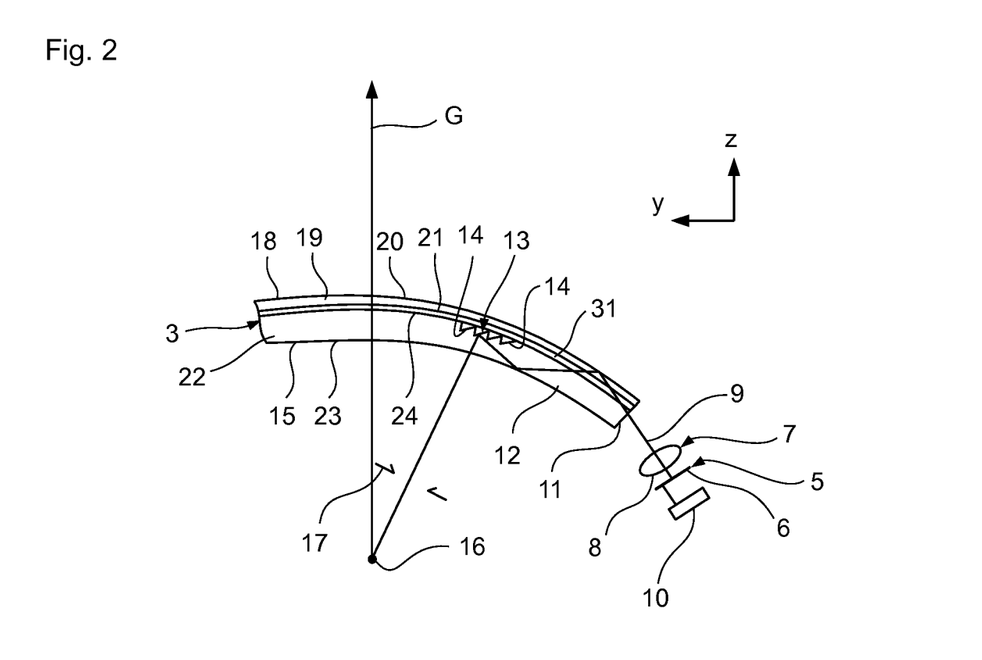
FIG. 2 shows an enlarged partial sectional view of the optical element of the display device according to the present invention illustrated in FIG. 1, including a schematic representation of the image generating module.
Figure 3:
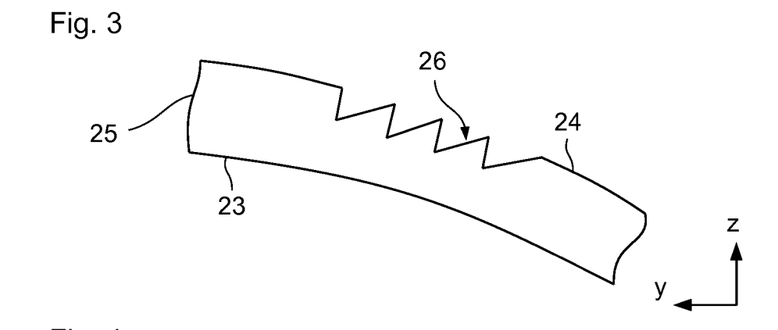
FIGS. 3-7 show partial sectional views for explaining the production of the optical element of FIG. 2 according to the present invention.

As can be seen best from the enlarged, schematic partial sectional view in FIG. 2, the display device 1 has an imaging optical unit 7, which includes an optical element 8 arranged between the image generating element 6 or the image generator 6 and the first spectacle lens 3. Furthermore, the first spectacle lens 3 itself also serves as part of the imaging optical unit 7.

A pencil of light 9 may emanate from each pixel of the image generator 6. The desired image can be generated by appropriate activation of the pixels of the image generator 6 by means of a control unit 10, which may be part of the image generating module 5. In FIG. 2, the path of rays of a light beam is depicted as representative of the pencil of light 9, and so hereinafter reference is also made to the light beam 9.

The light beam 9 emanating from the image generator 6 passes through the optical element 8 and enters the first spectacle lens 3 via an input portion 11 (here the end face of the first spectacle lens 3) and is guided in this spectacle lens along a light-guiding channel 12 to an output portion 13. The output portion 13 has a number of reflective deflecting surfaces 14 arranged next to one another (which may also be referred to as reflective facets), at which a reflection of the light beams 9 in the direction of a rear side 15 of the first spectacle lens 3 takes place, so that the light beams 9 emerge from the first spectacle lens 3 via the rear side 15.

Consequently, a user wearing the display device 1 according to the invention on his/her head as intended can perceive the image generated by means of the image generator 6 as a virtual image if he/she looks at the output portion 13. In the case of the embodiment described here, the user must look to the right by about 40°, based on the viewing direction G of looking straight ahead. In FIG. 2, the center of rotation 16 of the eye of the user and also the eye-box 17 or the exit pupil 17 of the imaging optical unit 7 are depicted for purposes of illustration. The eye-box 17 is the region that is provided by the display device 1 and in which the eye of the user can move and always still see the generated image as a virtual image.

Although in the case of the embodiment described the input is carried out via the end face of the first spectacle lens 3, and consequently the input portion 11 is formed on the end face of the first spectacle lens 3, it is also possible to carry out an input via the rear side 15 of the first spectacle lens.

As is shown in the schematic representation in FIG. 2, both the rear side 15 and the front side 18 of the first spectacle lens 3 are formed in a curved manner.

As can be seen in particular from the representations in FIG. 2, the first spectacle lens 3 is also formed as two shells and comprises an outer shell 19 with a first side 20 and a second side 21 and also an inner shell 22 with a first side 23 and a second side 24.

The first side 20 of the outer shell 19 forms the front side 18 of the first spectacle lens 3 and the first side 23 of the inner shell 22 forms the rear side 15 of the first spectacle lens 3. The second side 21 of the outer shell 19 and the second side 24 of the inner shell 22, which are facing one another, have complementary curvatures and are connected to one another over their surface area by way of an adhesive layer 31. For forming the adhesive layer 31, the adhesive composition is used as an adhesive for adhesively bonding the two shells 19, 22.

The light-guiding channel 12 is formed in such a way that the desired guidance of the light beams 9 from the input portion 11 to the output portion 13 takes place. This may take place for example by total internal reflection on the front side 18, which is equal to the first side 20 of the outer shell 19, and the rear side 15, which is equal to the first side 23 of the inner shell 22. It is of course also possible that a reflective coating which brings about the desired reflection of the light beams 9 is formed on the front side 18 and/or on the rear side 15 in the region of the light-guiding channel 12. The reflectivity of the reflective coating may for example be as great as possible (about 100%) or less. The reflective coating may consequently be formed as a mirror layer or as a partially reflective layer.

In the case of the embodiment described here, the two sides 20, 21 of the outer shell 19 are spherically curved and the first side 20 of the outer shell 19 has a radius of curvature of 94 mm and the second side 21 of the outer shell 19 has a radius of curvature of 92 mm. Consequently, the thickness of the outer shell is 2 mm. The outer shell 19 may however also be formed with a smaller thickness. For instance, the thickness of the outer shell 19 may lie in the range of 0.15 mm to less than 2 mm. In particular, the outer shell 19 may be formed as a dimensionally stable film. Dimensionally stable is understood here as meaning in particular that the film withstands at least gravitational force, and consequently retains its form if no other forces act on it.

The second side 24 of the inner shell 22 is spherically curved and has a radius of curvature that corresponds to the radius of the second side 21 of the outer shell 19. Here, this is therefore a radius of 92 mm. The first side 23 of the inner shell 22 is spherically curved and has the radius of curvature required for correcting the defective vision of the user (for example 150 mm when using PMMA as the material for the inner shell 22). Of course, the first side 23 of the inner shell may also be aspherically curved. The material of the outer shell 19 is preferably the same as the material of the inner shell 22. The thickness of the inner shell 22 depends substantially on the difference between the radius of the second side 24 of the inner shell 22 and the first side 23 of the inner shell 22 and in the example described here is about 3 mm.

As already mentioned, the materials of the inner shell 22 and the outer shell 19 are preferably the same, so that they have an identical refractive index. The inner shell 22 and the outer shell 19 are preferably adhesively bonded over their entire surface area by way of the adhesive layer 31, so that a compact first spectacle lens 3 is provided.

The first spectacle lens 3 of the embodiment described here provides a correction of +2 diopters.

Figure 4:
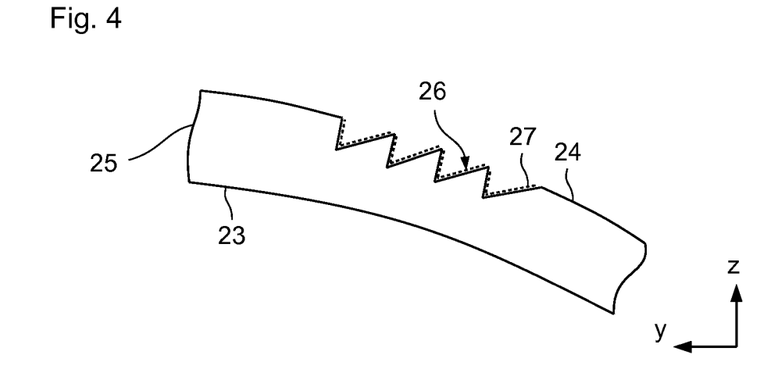

The optical element according to the invention can be produced as follows, referring generally to FIGS. 3-8:

In a first step, a first semifinished product 25 is produced from a thermoplastic polymer by injection molding. As shown in the enlarged partial sectional view of FIG. 3, the first semifinished product 25 has the first side 23 and the second side 24. Formed on the second side 24 is a microstructuring 26, which dictates the form of the desired reflective facets 14. The first semifinished product 25 is then coated in the region of the microstructuring 26 with an optically effective layer 27, which is represented by a dashed line (to simplify the representation, the layer 27 is not depicted in FIG. 2). Known coating processes, such as for example chemical vapor deposition (CVD) or physical vapor deposition (DVD), may be used for this. The optically effective layer 27, which is represented by a dashed line in FIG. 4, is chosen such that the relative facets 14 described are provided.

Figure 5:
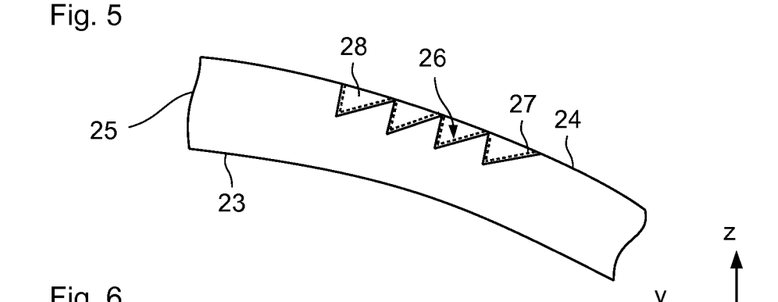

The depressions caused by the microstructuring 26, which extend from the second side 24 into the semifinished product 25, are filled in a subsequent step in such a way that a smooth continuous second side 24 is obtained (FIG. 5). The same material 28 as the material for producing the semifinished product 25 or else an optical cement or optical adhesive 28 may be used for filling the depressions. The composition according to the invention may be used in particular.

Figure 6:
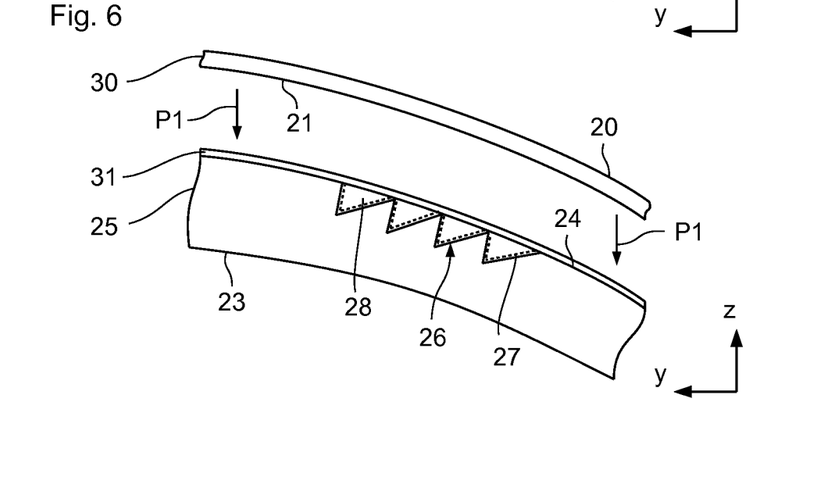
Figure 7:
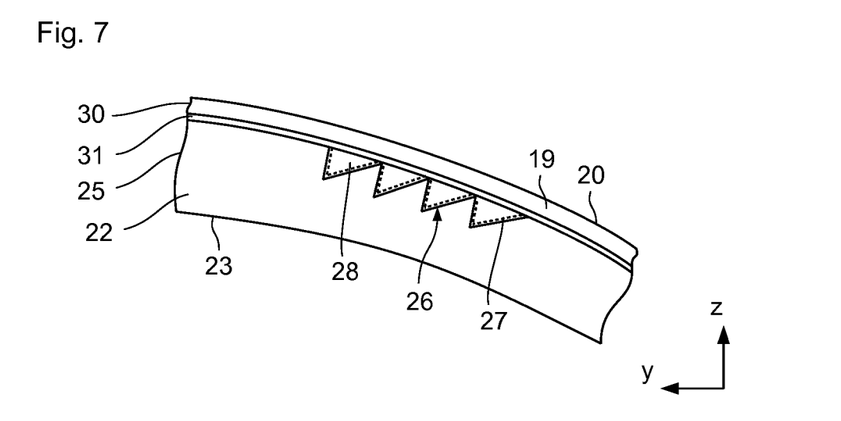

After that, the outer shell 19 is produced from a thermoplastic polymer by injection molding as the second semifinished product 30 in such a way that it has the first side 20 and the second side 21. The second semifinished product 30 may alternatively be produced before the production of the first semifinished product 25 or at the same time as the first semifinished product 25. The second semifinished product 28 is then adhesively bonded to the first semifinished product 25 over the entire surface area. For this purpose, the second side 21 of the second semifinished product 30 and/or the second side 24 of the first semifinished product 25 may be coated with an optical adhesive or optical cement in order to form an adhesive layer 31. In FIG. 6, the case in which the second side 24 of the first semifinished product 25 is coated with the adhesive layer 31 is shown. Then, the two semifinished products are brought into contact with one another at their surfaces 21 and 24 by way of the adhesive layer 31, which may also be referred to as the layer of adhesive, as indicated by the arrows P1 in FIG. 6, and the adhesive layer 31 is cured so as to produce the optical element 3 according to the invention, as shown in FIG. 7. This produces the optical element 3 according to the invention, which is made up of two shells, wherein the outer sides 23 and 20 of the two shells 19 and 22 form the rear side 15 and the front side 18 of the first spectacle lens 3.

Figure 8:
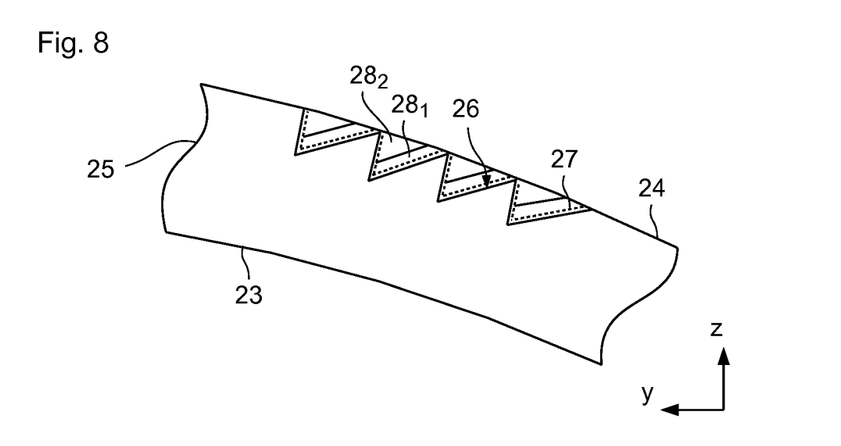
FIG. 8 shows a partial sectional view for explaining an alternative type of production of the optical element according to the present invention.

In FIG. 8, the first semifinished product 25 with the microstructuring 26 and the optically effective layer 27 is shown in an enlarged sectional representation. As a difference from the previously described filling of the microstructuring 26 in one step, in the case of the variant according to FIG. 8 this is carried out in two steps. In this way, undesired shrinkage that occurs during curing of the material of the filling layers $28_1$, $28_2$ (filling layer $28_1$ and then filling layer $28_2$) can be reduced. Of course, the filling may also be carried out in more than two steps, for example in three, four, five or six steps.

In the case of the display device 1 according to the invention, the introduction of the virtual image into the field of view of the user takes place via the first spectacle lens 3. It is of course also possible for it to be introduced via the second spectacle lens 4. Furthermore, the display device 1 may be formed in such a way that information or virtual images can be introduced via both spectacle lenses 3, 4. In this case, the introduction may take place in such a way that the impression of a three-dimensional image is created. However, this is not absolutely necessary.

The spectacle lenses 3, 4 may have a refractive power of zero or a refractive power other than zero (in particular for correcting defective vision). As shown in the figures, both the front side 11 and the rear side 12 of the spectacle lens 3 are formed in a curved manner. The front side 11 may in particular be spherically curved. If the spectacle lens has a refractive power other than zero in order to correct defective vision, the curvature of the rear side 15 is generally chosen appropriately in order to achieve a corresponding correction. The rear side 15 may have a curvature deviating from the spherical form.

The holding device 2 does not have to be formed as a spectacle-like holding device. Any other kind of holding device with which placement or wearing of the display device on the head of the user can take place is also possible.

In the case of the exemplary embodiments described, the spectacle lens 3 is formed as two shells. It is also possible however to produce the spectacle lens with more than two shells, for example at least three shells. In particular, the spectacle lens may be produced from two parts (which do not necessarily have to be shells) or from more than two parts. The shells or parts are then preferably adhesively bonded with the adhesive composition.

Example

The following example further helps explain the present invention.

When using polyurethanes of NXT® for the third material and Zeonex® for the first material, the following refractive indices have been obtained in experimental production:

Four polyurethane specimens from the company NXT showed at 22° C. the following four refractive indices $n_D$(589.3 nm):
Specimen 1: 1.5269
Specimen 2: 1.5272
Specimen 3: 1.5277
Specimen 4: 1.5277

For the cycloolefin polymer with the trade name Zeonex®, the following refractive index $n_D$(589.3 nm) was measured at 22° C. for the two products 480R and E48R:
Specimen A: 1.5254 (480R)
Specimen B: 1.5314 (E48R)

Mixing specimens A and B (65/100 parts by volume) produced a refractive index $n_D$ of 1.5275, which was adapted well to specimens 2 to 4.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant art will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An optical element for a display device which can be placed onto the head of a user and generates an image, the optical element comprising:
a front side and a rear side;
an input portion and an output portion spaced apart from the input portion; and
a light-guiding channel suitable for guiding bundles of light of pixels of a generated image that are input into the optical element via the input portion and output from the optical element via the output portion, wherein the output portion has an optically effective structure which brings about a deflection of the bundles of light for output; and
wherein the optical element comprises the optically effective structure, the optical element having a first part comprising a first material and a second part comprising a third material, wherein the first and second parts are connected to one another with an adhesive composition of a second material;
wherein the first material comprises at least two cycloolefin polymers, wherein the proportion of the at least two cycloolefin polymers is at least 95% by weight based on the total weight of the first material;
wherein the second material comprises at least one organic polymer;
wherein the first and third materials are different from one another, and the third material is not a cycloolefin polymer; wherein the third material comprises a polyurethane having particles with diameter between about 30 nm and about 50 nm and the proportion of the polyurethane polymer is at least 95% by weight based on the total weight of the third material; and
wherein the differences in a refractive index for at least one wavelength of between 380 nm and 800 nm between the first material and the second material and between the second material and the third material are in each case less than or equal to about 0.02.

2. The optical element of claim 1, wherein the proportion of the at least two cycloolefin polymers, based on the total weight of the first material, is at least about 98% by weight.

3. The optical element of claim 1, wherein the at least two cycloolefin polymers have different refractive indices from one another.

4. The optical element of claim 1, wherein the differences in the refractive index between the first material and the second material and between the second material and the third material for at least one wavelength of between 380 nm and 800 nm are in each case less than or equal to about 0.005.

5. The optical element of claim 1, wherein the difference in the refractive index between the first material and the third material for at least one wavelength of between 380 nm and 800 nm is less than or equal to about 0.005.

6. The optical element of claim 1, wherein the polyurethane particles comprise a nitride.

7. The optical element of claim 1, wherein the at least two cycloolefin polymers are made from monocyclic or polycyclic olefins chosen from cyclopentene, cyclohexene, cycloheptene, norbornene and derivatives thereof, cyclopentadiene, and the C5 fraction of dicyclopentadiene.

8. The optical element of claim 1, wherein the optically effective structure forms a depression in the first part and the depression is completely filled with the adhesive composition.

9. The optical element of claim 1, wherein the first part and the second part are in each case shells.

10. The optical element of claim 1, wherein the optically effective structure has reflective surface elements spaced apart from one another.

11. A display device having a holding device that can be placed onto the head of a user, an image generating module that is fastened to the holding device and generates an image and an imaging optical unit that is fastened to the holding device, has an optical element as claimed in claim 1 and, in the state of the holding device in which the holding device has been placed on the head of the user, projects the generated image in such a way that the user can perceive the generated image as a virtual image.

12. A method for producing an optical element according to claim 1 in which an optically effective structure is embedded, comprising the following steps:
   a) providing the first part having an upper side, which has a structured portion on the upper side;
   b) applying a coating which is optically effective for a predetermined wavelength range to the structured portion of the first part forming the optically effective structure;
   c) providing the second part having an underside, the underside of the second part having an underside form complementary to an upper side form of the upper side of the first part;
   d) applying the adhesive composition between the upper side of the first part and the underside of the second part; and
   e) connecting the upper side of the first part to the underside of the second part by means of the adhesive composition, producing the optical element having an embedded optically effective structure, wherein the first part comprises the first material and the second part comprises the third material.

13. The method of claim 12, wherein a difference in a first refractive index for at least one wavelength of between 380 nm and 800 nm between the first material and the second material is less than or equal to about 0.005.

14. The method of claim 13, wherein the differences in the first refractive index is less than or equal to about 0.001.

15. The method of claim 12, wherein the differences in a second refractive index for at least one wavelength of between 380 nm and 800 nm between the second material and the third is less than or equal to about 0.005.

16. The method of claim 13, wherein the differences in the second refractive index is less than or equal to about 0.001.

17. The optical element of claim 9, wherein each case shell comprises a single unitary piece.

18. A display device comprising:
   a holding device that can be placed onto the head of a user having at least one optical element attached to the holding device;
   an image generating module arranged on the holding device;
   wherein the at least one optical element comprises a front side and a rear side, an input portion spaced apart from an output portion, and a light-guiding channel suitable for guiding bundles of light of pixels of a generated image that are input into the optical element via the input portion and output from the optical element via the output portion, wherein the output portion has an optically effective structure that brings about a deflection of the bundles of light for output, and
   wherein the at least one optical element comprises an optically effective structure and has a first and a second part connected by an adhesive composition, the first part comprising a first material comprising at least two cycloolefin polymers in an amount of at least 95% by weight based on the total weight of the first material, the adhesive composition comprising a second material comprising at least one organic polymer, and the second part comprising a third material that is different from the first material and does not comprise a cycloolefin polymer, wherein the third material comprises a polyurethane having particles with diameter between about 30 nm and about 50 nm and the proportion of the polyurethane polymer is at least 95% by weight based on the total weight of the third material, and wherein the differences in a refractive index for at least one wavelength of between 380 nm and 800 nm between the first material and the second material and between the second material and the third material are in each case less than or equal to about 0.02.

19. The display device of claim 18, wherein the holding device is a spectacle frame and the at least one optical element attached to the spectacle frame is a spectacle lens.

* * * * *